(No Model.) 2 Sheets—Sheet 1.
D. H. BALL.
BAND SAW SHINGLE MACHINE.
No. 499,698. Patented June 20, 1893.
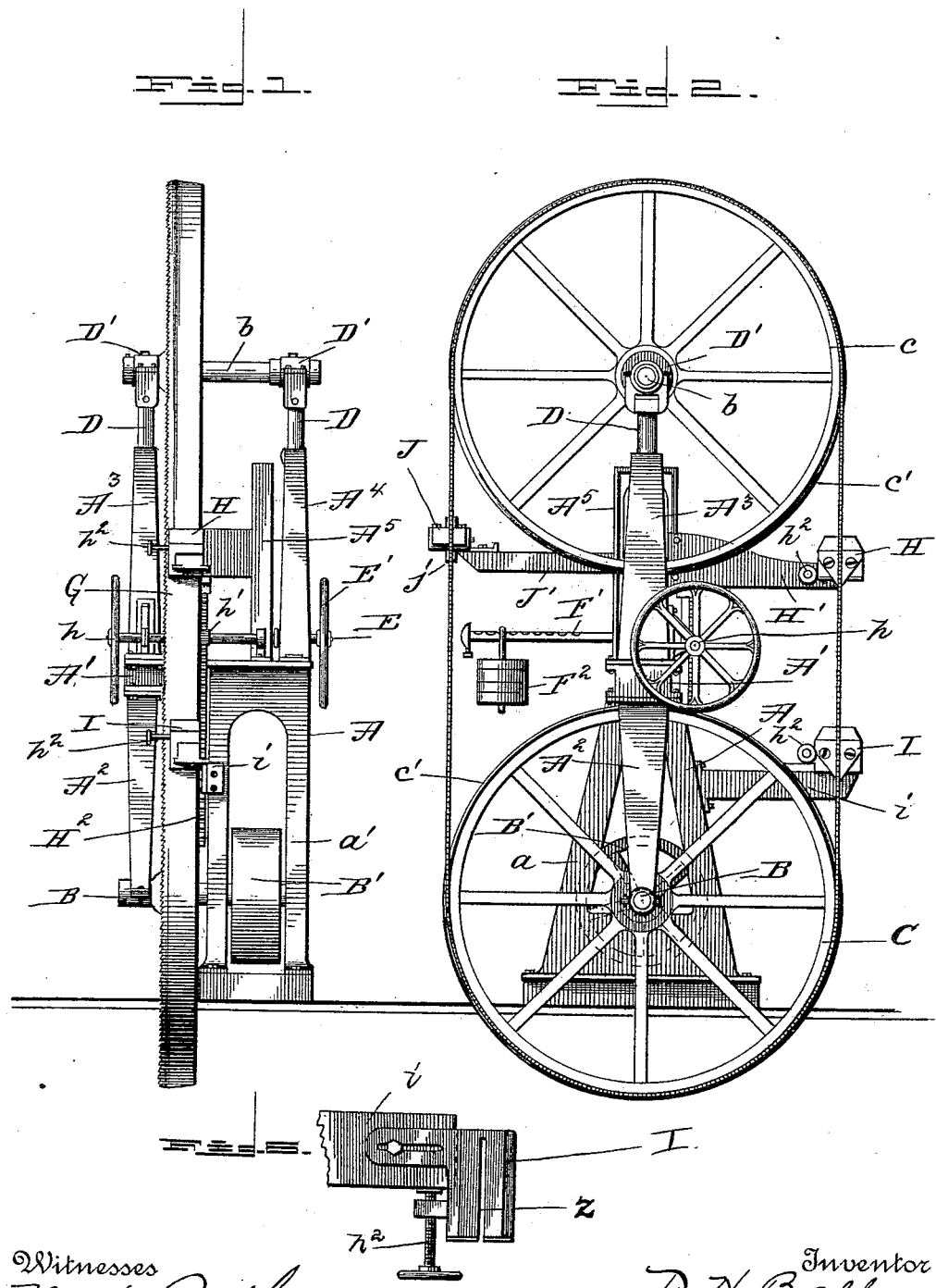

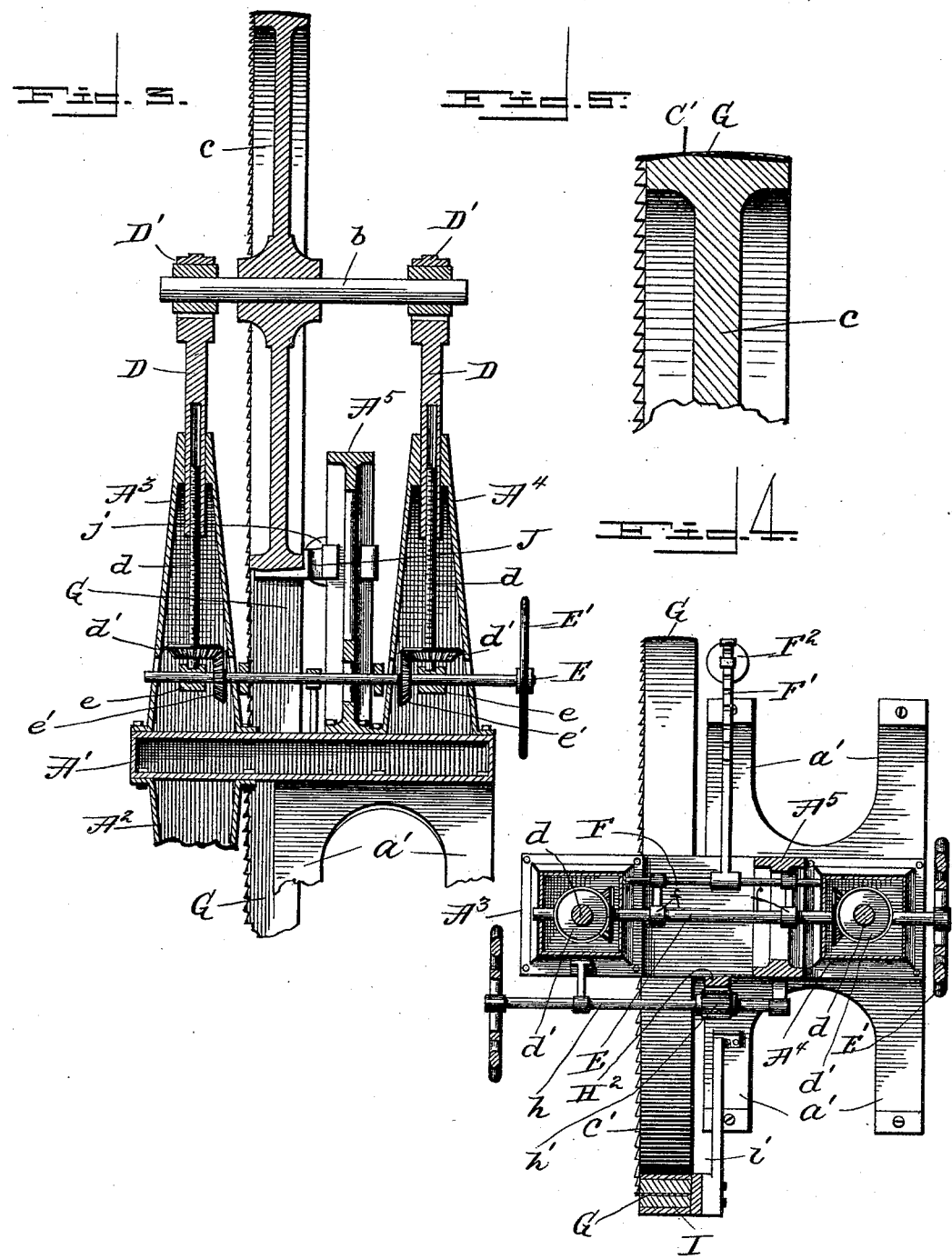

UNITED STATES PATENT OFFICE.

DAVID H. BALL, OF RENOVO, PENNSYLVANIA.

BAND-SAW SHINGLE-MACHINE.

SPECIFICATION forming part of Letters Patent No. 499,698, dated June 20, 1893.

Application filed June 1, 1892. Serial No. 435,176. (No model.)

*To all whom it may concern:*

Be it known that I, DAVID H. BALL, of Renovo, in the county of Clinton and State of Pennsylvania, have invented certain new and useful Improvements in Band-Saw Shingle-Machines; and I do hereby declare that the following is a full, clear, and exact description thereof, reference being had to the accompanying drawings, and to the letters of reference marked thereon, which form part of this specification.

This invention is an improvement in the mountings of band-saws for shingle mills, &c., and its objects are to insure the true running of the band saw and to prevent kinking or twisting thereof when in operation by putting the greatest tension on the band saw near the teeth thereof, so that the toothed edge of the band saw will be more taut or under greater tension than the body of the saw blade, thus insuring clean and rapid cutting. This I accomplish by a novel manner of facing the saw pulleys, to wit:—making their perimeters angular or double beveled in cross section, as hereinafter described.

Another object is to automatically tension the saw, through the medium of the positive tensioning or adjusting devices, so that the band saw will be kept at the proper tension, under all atmospheric conditions, or its tension be unaltered by expansion or contraction of the blade. This is accomplished by mounting the upper pulley in adjustable bearings which are in turn mounted on a movable support controlled by a weighted lever.

The invention consists in the novel construction and combinations of parts hereinafter fully described and summarized in the claims.

Referring to the drawings:—Figure 1 is a front elevation of my improved band-saw mountings for shingle-making machines. Fig. 2 is a side view thereof. Fig. 3 is a detail transverse vertical sectional view, showing the mechanism for adjusting the upper pulley. Fig. 4 is a detail horizontal section view showing the adjusting mechanism. Fig. 5 is a cross sectional view of the pulley rims, and saw thereon. Fig. 6 is a detail.

Referring to the drawings by letters:—A represents the main supporting frame, having vertical ends $a$, and inclined sides $a'$. On the bottom webs of the end pieces are formed bearings for the main shaft B, upon which (between the end-pieces) is fixed the driving pulley B', and on the end of this shaft, outside the frame, is keyed the lower band-saw pulley C.

A' is a horizontal extension or bracket projecting from the upper end of frame A, over the pulley C; and $A^2$, is a hanger arm depending from the outer extremity of said bracket and having a journal bearing on its lower end for the outer end of shaft B, as shown.

$A^3$, $A^4$, are hollow uprights mounted respectively on top of frame A, and on bracket A', and D, D, are vertically movable shafts telescoping into the said uprights, and carrying on their upper ends journal boxes D', in which is mounted a shaft $b$, carrying a band-saw pulley $c$, similar to pulley C, and vertically above the latter.

$d$, $d$, are screw-threaded rods in uprights $A^3$, $A^4$, tapped into threaded sockets in the lower ends of shafts D, D, and having their lower ends stepped in blocks $e$, $e$, carried by a shaft E, lying parallel with but intermediate shafts B, $b$, and extending through openings in the sides of uprights $A^3$, $A^4$. Shaft E in turn is journaled in arms $f$, $f$, attached to a rock shaft F, journaled in the uprights $A^3$, $A^4$.

F' is a lever rigidly connected to shaft F, and by depressing the outer end of said lever shaft E may be lifted vertically, thereby lifting rods $d$, $d$, shafts D, D, $b$, and pulley $c$, as is evident.

$d'$ $d'$ are beveled pinions on the lower ends of rods $d$, $d$, meshing with beveled pinions $e'$ $e'$ on the shaft E as shown, and E' is a hand wheel by which shaft E can be rotated in its bearings.

It will be understood that when shaft E is rotated rods $d$ are also rotated, and consequently shafts D, D, elevated or lowered, because of the threaded connection between rods $d$ and said shafts. By this means pulley $c$ may be moved toward or from pulley C.

By reference to Fig. 5 it will be observed that the peripheries of the pulleys C and c are angular, each having a circumferential projection or rib c' near one (the outer) edge of the pulley, the face of the pulley sloping at each side from the apex of this rib to the edge of the pulley, so that the apex of the rib stands above, and is larger in circumference than the other portions of the rim.

G designates the band saw, of ordinary construction, belted over pulleys C, c, as shown, in the usual manner, with its toothed edge at the narrow side of the pulleys; to wit—the side adjoining rib c'. Consequently when the pulleys are separated to tension the saw, the toothed edge of the saw blade will be strained to a greater extent than its rear edge, and the saw is consequently slightly bent transversely over the pulleys and thereby kept from lateral displacement thereon and runs truly always, and what is most important the toothed edge is kept taut, and buckling of the saw between the pulleys is prevented.

H and I are the front saw guides. The upper guide H is mounted on the end of an arm H' the inner end of which is slidably connected to the side of a vertical bracket $A^5$ fixed on top of the main frame, intermediate uprights $A^3$, $A^4$. Arm H' is vertically adjusted by means of a depending rack $H^2$ attached rigidly thereto and engaged by a pinion h' on the inner end of a shaft h journaled in brackets attached to upright $A^4$, and bracket $A^5$. Said shaft can be turned by a hand wheel, as shown. The lower guide I is mounted on the end of an arm i rigidly secured to the base A. The said guides see Fig. 6 have vertical slits Z in them to accommodate the saw, and are pivotally mounted on the ends of their supporting arms, so that they can be moved in a horizontal plane, and are adjusted in such plane by means of hand screws $h^2$, $i^2$, by which the guides may be adjusted so as to "gather" or "thrust" i. e.—to deflect the toothed edge of band saw slightly toward, or away from the front edge of the pulleys C, c.

J is the rear saw guide, rigidly but adjustably mounted on the end of the arm J' fixed to the bracket $A^5$ as indicated in the drawings. This guide has a friction roller j against which the rear smooth edge of the band saw contacts. When the band saw is belted on the pulleys C, c, shaft E is turned so as to give the saw the proper tension by shifting pulley c as described.

A weight $F^2$ is hung on the outer end of lever F' and by it, the position of shaft E, is regulated, and should the band saw expand or contract, the weighted lever and connections between it and the movable band saw pulley will automatically maintain a constant and uniform tension thereon.

What I consider the most valuable feature of my present invention, is the ribbed or angular faced band saw pulleys, by which the toothed edge of band saw is kept perfectly taut, and the saw caused to assume such a shape that it will not slip laterally on the pulleys, nor buckle between the front guides, whereby I can run the saw at greater speed, and do more and better work.

Having described my invention, what I claim as new, and desire to secure by Letters Patent thereon, is—

1. A band saw wheel having its periphery in cross section produced by slightly beveling its edges in opposite directions, the meeting point of said bevels being the highest point of the wheel and forming a biting edge adapted to keep the saw on the wheel and yet not injure it, and to allow the saw edge to self-adjust itself, in cutting, substantially as described.

2. In combination with a band saw, a carrying wheel therefor having its perimeter slightly beveled from both edges toward the center said bevels meeting nearer one edge of the wheel than the other, the apex of these bevels being the largest circumference of the wheel, substantially as described.

3. The combination of the uprights, the shafts telescoping therein, the screw threaded rods engaging said shafts, the beveled gears on said rods, the horizontal revoluble shaft supporting said rods, and the bevel gears on said shaft engaging the gears on the rod, substantially as and for the purpose described.

4. The combination of the uprights, the shafts telescoping therein, the screw threaded rods engaging said shafts, the beveled gears on said rods, the horizontal revoluble shaft supporting said rods, and the bevel gears on said shaft engaging the gears on the rod, and mechanism for adjusting said horizontal shaft vertically, substantially as and for the purpose described.

5. The combination of the uprights, the rock shaft journaled thereon, the horizontal shaft journaled in crank arms connected to said rock shaft, the vertically movable shafts telescoping in said uprights, and the adjustable connections between said movable shafts and said horizontal shaft, substantially as and for the purpose described.

6. The combination of the uprights, the shafts telescoping therein, the screw threaded rods engaging said shafts, the beveled gears on said rods, the horizontal revoluble shaft supporting said rods, and the bevel gears on said shaft engaging the gears on the rods; with the rock shaft, its weighted lever, and crank arms for automatically vertically adjusting said horizontal shaft, substantially as described.

7. The combination of the main frame, the main shaft journaled therein, the band saw pulley on said shaft, the uprights above said pulley, the vertically adjustable shafts connected to said uprights the horizontal shaft carried by said vertical shafts, the band saw pulley thereon, and the horizontal revoluble shaft supporting said vertically adjustable shafts and geared thereto, and mechanism for automatically adjusting said horizontally revoluble shafts to maintain the tension of the saw, substantially as and for the purpose set forth.

In testimony that I claim the foregoing as my own I affix my signature in presence of two witnesses.

DAVID H. BALL.

Witnesses:
JOHN W. THOMPSON,
EDWIN M. BALL.